(12) United States Patent
Kolding et al.

(10) Patent No.: US 7,843,801 B2
(45) Date of Patent: Nov. 30, 2010

(54) OPTIMUM TECHNIQUE FOR ENCODING AND DECODING PHYSICAL RESOURCE BLOCK LOCATIONS

(75) Inventors: Troels E. Kolding, Klarup (DK); Frank Frederiksen, Klarup (DK); Jyri K. Hamalainen, Oulu (FI); Preben E. Mogensen, Gistrup (DK)

(73) Assignee: Nokia Corporation, Espoo (FI)

( * ) Notice: Subject to any disclaimer, the term of this patent is extended or adjusted under 35 U.S.C. 154(b) by 302 days.

(21) Appl. No.: 12/075,950

(22) Filed: Mar. 14, 2008

(65) Prior Publication Data

US 2008/0267058 A1 Oct. 30, 2008

Related U.S. Application Data

(60) Provisional application No. 60/918,390, filed on Mar. 16, 2007.

(51) Int. Cl.
*H04J 11/00* (2006.01)
(52) U.S. Cl. ......................... 370/203; 370/328
(58) Field of Classification Search ................ 370/208, 370/203, 328, 344
See application file for complete search history.

(56) References Cited

U.S. PATENT DOCUMENTS

| | | | |
|---|---|---|---|
| 2006/0209672 A1* | 9/2006 | Tarokh et al. | 370/208 |
| 2007/0140105 A1* | 6/2007 | Coon | 370/208 |
| 2007/0201351 A1* | 8/2007 | Egashira et al. | 370/208 |
| 2009/0268602 A1* | 10/2009 | Han et al. | 370/208 |

OTHER PUBLICATIONS

Huawei, "Overhead reduction of Best-M based CQI reporting", 3GPP TSG RAN WG1 Meeting #47, No. R1-063086, Nov. 10, 2006, Riga, Latvia, XP002508462.

Huawei, "Description of UL L1/L2 control message", 3GPP TSG RAN WG1 Meeting #48, No. R1-070899, Feb. 16, 2007, St. Louis, MO, US, XP002508463.

LG Electronics, "System Level Simulations and Analysis of CQI reporting schemes", 3GPP TSG RAN WG1 Meeting #48, No. R1-070920, Feb. 16, 2007, St. Louis, MO, US, XP002508464.

3GPP TR 25.814 V7.1.0 (Sep. 2006), Technical Specification Group Radio Access Network; Physical layer aspects for evolved Universal Terrestrial Radio Access (UTRA) (Release 7), pp. 1-132.

3GPP TSG RAN WG1 #47, Tdoc R1-063094, "Comparison of CQI feedback schemes", Mitsubishi Electric, Riga, Latvia, Nov. 6-10, 2006, pp. 1-9.

(Continued)

*Primary Examiner*—Brian D Nguyen
(74) *Attorney, Agent, or Firm*—Harrington & Smith

(57) ABSTRACT

An apparatus, such as a user equipment, includes a resource unit RU measurement unit coupled to an output of a wireless receiver; an encoder configurable to encode information descriptive of M perceived best ones of N RUs, where each individual RU is assigned a unique number from a set $$\{1,2,\ldots,N\},$$

where there are sets:

$$S_M = \{n = (n_m)_{m=1}^M : 1 \le n_1 < n_2 < \ldots < n_M \le N\},$$

$$\aleph_M = \{1, 2, \Lambda, |S_M|\},$$

where each vector in set $S_M$ refers to a unique RU combination and where there are $$|S_M| = \binom{N}{M}$$

elements in the set $S_M$; and a wireless transmitter configurable to transmit the encoded information to a wireless network apparatus, such as a base station. The base station includes a decoder operable to decode the encoded information.

21 Claims, 5 Drawing Sheets

OTHER PUBLICATIONS

3GPP TSG-RAN WG 1 #48, R1-070873, "Signaling Resource Allocations in DL Control Channel", Alcatel-Lucent, St. Louis, Feb. 12-16, 2007, pp. 1-10.

3GPP TSG-RAN WG1 #47, R1-063330, "CQI Report for WCDMA MIMO", Nokia, Riga, Latvia, Nov. 6-10, 2006, 5 pages.

3GPP TSG RAN WG1 #46bis, Tdoc R1-062543, "Comparison of CQI feedback schemes", Mitsubishi Electric, Seoul, Korea, Oct. 9-13, 2006, pp. 1-8.

3GPP TSG RAN WG1 RAN1 #47, R1-063086, "Overhead reduction of Best-M based CQI reporting", Huawei, Riga, Latvia, Nov. 6-10, 2006, 4 pages.

TSG RAN WG1 #48, R1-070899, "Description of UL L1/L2 control message", Huawei, St. Louis, USA, Feb. 12-16, 2007, 3 pages.

3GPP RAN WG1 #48, R1-070920, "System Level simulation and analysis of CQI reporting schemes", LG Electronics, St. Louis, USA, Feb. 12-16, 2007.

* cited by examiner

| VALUE OF M | ENCODING VIA BIT MASK OR PRB LOCATION(BITS) | ENCODING VIA COMPRESSION ALGORITHM IN ACCORDANCE WITH EXEMPLARY EMBODIMENTS OF THIS INVENTION(BITS) | SIGNALING SAVING(%) |
|---|---|---|---|
| 1 | 5 | 5 | 0 |
| 2 | 10 | 9 | 10 |
| 3 | 15 | 12 | 20 |
| 4 | 20 | 14 | 30 |
| 5 | 25 | 16 | 36 |
| 6 | 25 | 18 | 28 |
| 7 | 25 | 19 | 24 |
| 8 | 25 | 21 | 16 |
| 9 | 25 | 21 | 16 |
| 10 | 25 | 22 | 12 |
| 11 | 25 | 23 | 8 |
| 12 | 25 | 23 | 8 |
| 13 | 25 | 23 | 8 |
| 14 | 25 | 23 | 8 |
| 15 | 25 | 22 | 12 |
| 16 | 25 | 21 | 16 |
| 17 | 25 | 21 | 16 |
| 18 | 25 | 19 | 24 |
| 19 | 25 | 18 | 28 |
| 20 | 25 | 16 | 36 |
| 21 | 20 | 14 | 30 |
| 22 | 15 | 12 | 20 |
| 23 | 10 | 9 | 10 |
| 24 | 5 | 5 | 0 |
| 25 | 0 | 0 | 0 |

FIG.3

| CQI WORD SIGNALED | INDEX OF FIRST PRB | INDEX OF SECOND PRB |
|---|---|---|
| 9 | 1 | 2 |
| 8 | 1 | 3 |
| 7 | 1 | 4 |
| 6 | 1 | 5 |
| 5 | 2 | 3 |
| 4 | 2 | 4 |
| 3 | 2 | 5 |
| 2 | 3 | 4 |
| 1 | 3 | 5 |
| 0 | 4 | 5 |

FIG.4

$$\begin{cases} \begin{cases} f(1,2,3,4)=1,f(1,2,3,5)=2,f(1,2,3,6)=3 \\ f(1,2,4,5)=4,f(1,2,4,6)=5, \\ f(1,2,5,6)=6, \\ f(1,3,4,5)=7,f(1,3,4,6)=8, \\ f(1,3,5,6)=9 \\ f(1,4,5,6)=10 \end{cases} \\ \begin{cases} f(2,3,4,5)=11,f(2,3,4,6)=12 \\ f(2,3,5,6)=13, \\ f(2,4,5,6)=14, \end{cases} \\ \{ f(3,4,5,6)=15, \end{cases}$$

FIG.5

OPTIMUM TECHNIQUE FOR ENCODING AND DECODING PHYSICAL RESOURCE BLOCK LOCATIONS

CLAIM OF PRIORITY FROM COPENDING PROVISIONAL PATENT APPLICATION

This patent application claims priority under 35 U.S.C. §119(e) from Provisional Patent Application No.: 60/918, 390, filed Mar. 3, 2007, the disclosure of which is incorporated by reference herein in its entirety.

TECHNICAL FIELD

The exemplary and non-limiting embodiments of this invention relate generally to wireless communication systems, methods, devices and computer program products and, more specifically, relate to techniques to optimally encode information in a first network node, such as in a user equipment, for transmission to a second network node, such as a base station, and to decode the encoded information at the second network node.

BACKGROUND

Various abbreviations that appear in the specification and/or in the drawing figures are defined as follows:

| | |
|---|---|
| 3GPP | third generation partnership project |
| UTRAN | universal terrestrial radio access network |
| Node B | base station |
| UE | user equipment |
| EUTRAN | evolved UTRAN |
| aGW | access gateway |
| eNB | EUTRAN Node B (evolved Node B) |
| PRB | physical resource block |
| NPRB | number of PRBs |
| LTE | long term evolution |
| BW | bandwidth |
| CQI | channel quality indicator |
| FDMA | frequency division multiple access |
| OFDM | Orthogonal Frequency Domain Multiplex |
| PS | packet scheduler |
| LA | link adaptation |
| FDPS | frequency domain packet scheduler |
| SC-FDMA | single carrier FDMA |
| UL | uplink (UE to eNB) |
| DL | downlink (eNB to UE) |
| MIMO | multiple input, multiple output |

The exemplary embodiments of the invention described herein relate generally to wireless communication systems that apply OFDMA in the downlink, where a UE may be freely allocated to frequency bands or sub-bands. One exemplary, but non-limiting type of such a wireless communication system is the LTE of 3GPP, also known as EUTRAN. The current working assumption in 3GPP is that the DL access technique will be OFDM, which will create an opportunity to perform link adaptation and user multiplexing in the frequency domain. The UL access technique will be SC-FDMA.

In order to be able to perform adaptation in the frequency domain, it is important that the PS and LA units in the Node B have knowledge of the instantaneous channel quality. This knowledge is obtained through the signaling of CQI reports from the different UEs served by the Node B. Several approaches for defining the CQI contents (what is actually signaled) have been discussed in 3GPP. Common to many of these approaches (e.g., single-stream and MIMO CQI methods) is that the UE indicates its best PRBs out of all the available PRBs. Examples of this approach have been referred to as 'best-M' and 'threshold CQI'.

However, as the possible number of best PRBs out of a total number of PRBs to be reported increases, the resulting permutation space grows dramatically. As this permutation space grows, the number of distinct signalling values also increases, thereby placing significant processing, memory storage and signaling burdens on both the UE and Node B CQI reporting mechanisms.

Reference with regard to aspects of the foregoing description of CQI reporting can be made to 3GPP TR 25.814, V1.5.0 (2006-05), 3rd Generation Partnership Project; Technical Specification Group Radio Access Network; Physical Layer Aspects for Evolved UTRA (Release 7), generally pages 1-22 as well as pages 47-49, which include Sections 7.1.3.1.1.1 "Channel Quality Measurements" and 7.1.3.1.1.1.1 "Channel Quality Indicator".

Reference may also be had to: 3GPP TSG RAN WG1 RAN meeting #47, Riga, Latvia, 6-10 Nov., 2006, R1-063086, "Overhead reduction of Best-M based CQI reporting", Huawei, as well as to 3GPP TSG RAN WG1 RAN meeting #47, Riga, Latvia, 6-10 Nov., 2006, R1-063094, "Comparison of CQI feedback schemes", Mitsubishi Electric.

Reference may also be made to 3GPP TSG-RAN WG1 Meeting #48, St. Louis, USA, 12-16 Feb. 2007, R1-070873, "Signaling Resource Allocations in DL Control Channel", Alcatel-Lucent.

SUMMARY

The foregoing and other problems are overcome, and other advantages are realized, by the use of the exemplary embodiments of this invention.

In a first aspect thereof the exemplary embodiments of this invention provide a method and a computer-readable medium that stores a computer program. Execution of the method and the program results in the steps and operations that include encoding information descriptive of M perceived best ones of N resource units RUs, where each individual RU is assigned a unique number from a set $$\{1,2,\ldots,N\},$$

where there are sets:

$$S_M = \{n = (n_m)_{m=1}^M : 1 \leq n_1 < n_2 < \ldots < n_M \leq N\},$$

$$\aleph_M = \{1, 2, \Lambda, |S_M|\},$$

where each vector in set $S_M$ refers to a unique RU combination and where there are $$|S_M| = \binom{N}{M}$$

elements in the set $S_M$; and transmitting the encoded information from a first wireless apparatus to a second wireless apparatus.

In another aspect thereof the exemplary embodiments of this invention provide an apparatus that includes a resource unit RU measurement unit coupled to an output of a wireless receiver; an encoder configurable to encode information descriptive of M perceived best ones of N RUs, where each individual RU is assigned a unique number from a set $$\{1,2,\ldots,N\},$$

where there are sets:

$$S_M = \{n = (n_m)_{m=1}^M : 1 \leq n_1 < n_2 < \ldots < n_M \leq N\},$$

$$\aleph_M = \{1, 2, \Lambda, |S_M|\},$$

where each vector in set $S_M$ refers to a unique RU combination and where there are $$|S_M| = \binom{N}{M}$$

elements in the set $S_M$; and a wireless transmitter configurable to transmit the encoded information to a wireless network apparatus.

In accordance with further exemplary aspects the non-limiting embodiments of this invention provide a method and a computer-readable medium that stores a computer program at a receiver of the encoded information. Execution of the method and the program results in the steps and operations that include receiving encoded information descriptive of M perceived best ones of N resource units RUs, where each individual RU is assigned a unique number from a set $\{1, 2, \ldots, N\}$, and where there are sets:

$$S_M = \{n = (n_m)_{m=1}^M : 1 \leq n_1 < n_2 < \ldots < n_M \leq N\},$$

$$\aleph_M = \{1, 2, \Lambda, |S_M|\},$$

where each vector in set $S_M$ refers to a unique RU combination and where there are $$|S_M| = \binom{N}{M}$$

elements in the set $S_M$, and where there is a function $f_M : S_M \to \aleph_M$ such that $f_M(S_M) = \aleph_{MM}$ ($f_M$ is onto) and $f_M(\tilde{n}) \neq f_M(n)$ if and only if $\tilde{n} \neq n$ ($f_M$ is one-to-one), where elements in the set $S_M$ may be ordered in different ways; and decoding the received information, for a given M and $f_M(\hat{n})$, to find $\hat{n}$ by decoding steps that comprise:
A. computing values $g_1(k) = f_M(k, k+1, \ldots, k+M-1)$, $k = 1, 2, \ldots, N-M+1$;
B. finding k such that $g_1(k) \leq f_M(\hat{n}) \leq g_1(k+1)$;
C. setting $\hat{n}_1 = k$; and returning to step A and searching $\hat{n}_2, \hat{n}_3, \ldots \hat{n}_M$ during successive M−1 decoding rounds.

Also disclosed is a further apparatus that includes a receiver configurable to receive encoded information descriptive of M perceived best ones of N resource units RUs, where each individual RU is assigned a unique number from a set $\{1, 2, \ldots, N\}$, and where there are sets:

$$S_M = \{n = (n_m)_{m=1}^M : 1 \leq n_1 < n_2 < \ldots < n_M \leq N\},$$

$$\aleph_{MM} = \{1, 2, \Lambda, |S_M|\},$$

where each vector in set $S_M$ refers to a unique RU combination and where there are $$|S_M| = \binom{N}{M}$$

elements in the set $S_M$, and where there is a function $f_M : S_M \to \aleph_{MM}$ such that $f_M(S_M) = \aleph_{MM}$ ($f_M$ is onto) and $f_M(\tilde{n}) \neq f_M(n)$ if and only if $\tilde{n} \neq n$ ($f_M$ is one-to-one), where elements in the set $S_M$ may be ordered in different ways; and a decoder coupled to an output of the receiver and configurable to decode the received information, for a given M and $f_M(\hat{n})$, to find $\hat{n}$ by decoding operations that comprise:
A. computing values $g_1(k) = f_M(k, k+1, \ldots, k+M-1)$, $k = 1, 2, \ldots, N-M+1$;
B. finding k such that $g_1(k) \leq f_M(\hat{n}) \leq g_1(k+1)$;
C. setting $\hat{n}_1 = k$; and returning to operation A and searching $\hat{n}_2 \hat{n}_3, \ldots \hat{n}_M$ during successive M−1 decoding rounds.

BRIEF DESCRIPTION OF THE DRAWINGS

In the attached Drawing Figures:

FIG. 3 illustrates a Table showing the contrast in the signaling requirements of the encoding via bit mask or PRB location (bits) versus the compression algorithm in accordance with the exemplary embodiments of this invention (savings are listed in percent).

FIG. 4 is a Table illustrating an output of the encoding algorithm in accordance with the exemplary embodiments of this invention for the case of signaling M=2 out of N=5 PRBs from the UE to the eNB.

FIGS. 5 and 6 depict operation of a decoding algorithm in accordance with exemplary embodiments of this invention.

DETAILED DESCRIPTION

Figure 1:
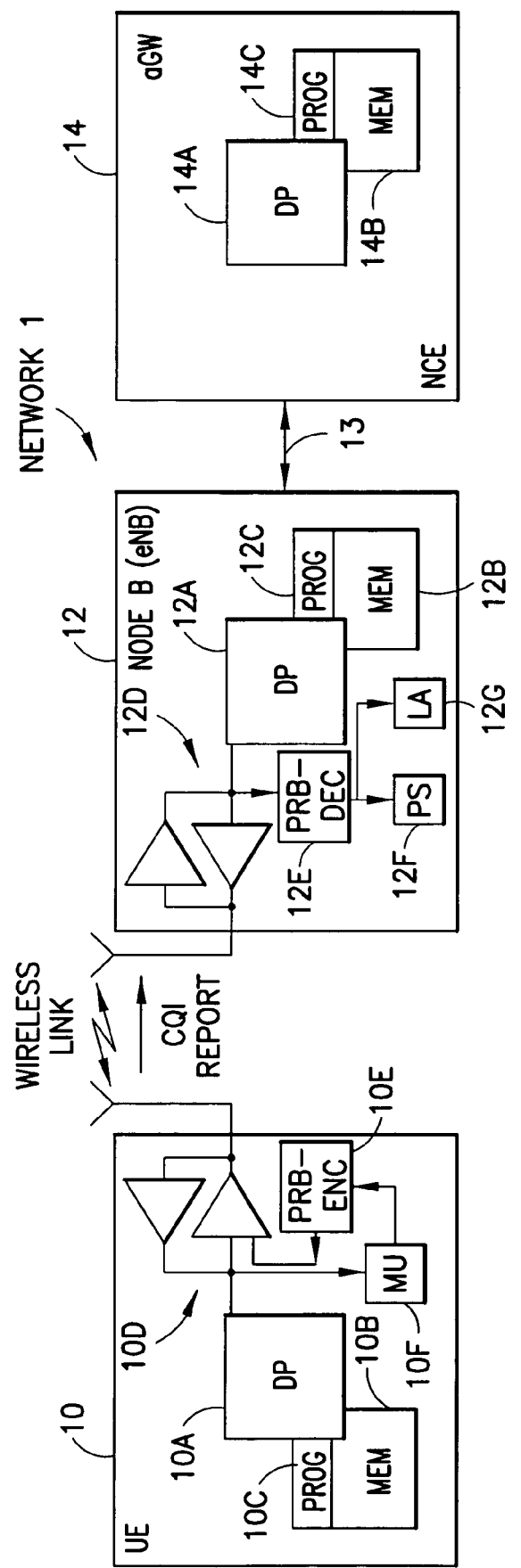
FIG. 1 shows a simplified block diagram of various electronic devices that are suitable for use in practicing the exemplary embodiments of this invention.

It is noted at the outset that the exemplary embodiments of this invention to be described below may be employed in any wireless control system having N resource channels that can be flexibly selected from, where the N resource channels may be, for example, in the spatial domain, the code domain, the frequency domain and the time domain, as well as combinations of these various domains.

The exemplary embodiments of this invention are presented below primarily in the context of the best-M approach, as this is a baseline assumption in 3GPP for LTE. However, the exemplary embodiments are not limited for use only with the best-M approach, as will be made evident. In the following description the PRB is used as the indication for the CQI signalling bandwidth in general (in 3GPP it has been discussed that the CQI-PRB may equal any integer number of physical PRBs, e.g. 2×PRB, 5×PRB, etc.)

By way of introduction, in order to achieve the highest possible frequency domain packet scheduling gain the UE should have a wide flexibility in proposing the best PRBs to the network. That is, there should be no restrictions on which PRBs the UE may select for its CQI signaling. According to the CQI method of choice, the number of good PRBs (M) is known by the UE before encoding the CQI message. Either it is directly specified, or the CQI scheme specifies a way for the UE to extract M. Once M is known, one may employ the use of a bit mask (of length PRB), or one may simply signal the position of each of the M PRBs. With, for example, 25 PRBs, it is most efficient to explicitly signal the position of each good PRBs up to M=5. For higher values of M, it may be better (more efficient) to signal the PRB mask instead. In this context, a PRB mask is a list of entries, where the locations of the signaled good PRBs can be indicated by ones (1), while the others are indicated by zeros (0). As the PRB mask itself gives indications for each PRB, this approach may give much more flexibility than is needed. As a result it may be considered that neither one of these approaches is optimum, as the "optimum permutation space" can become very complex to handle. As an example, the number of possibilities for selecting M PRBs out of N total PRBs equals:

$$\Lambda = \binom{N}{M} = \frac{N!}{(N-M)!M!}$$

If one assumes (by example) N=25 and M=5, this leads to 53,130 elements that could optimally be compressed to 16 bits (which would represent an improvement on the two approaches noted above). One could construct a lookup table (LUT) for this purpose, but in general the LUT could be very large (in this case 53130*25/8=166 kbytes). For an exemplary 20 MHz EUTRAN case there are 50 PRBs and if (for example) M=10, the LUT size increases to an impractical 32 gigabytes. As the LUT would preferably be implemented in fast access memory, a LUT of this size would be essentially impossible to implement using current memory technology (e.g., semiconductor memory) in a cost-effective portable device such as a cellular phone. However, as the possible gain that may be achievable by this approach is so large, in at least signaling space savings, this approach should not be rejected out-of-hand. In fact, and as will be shown below, the inventors have developed a unique 1-1 mapping that facilitates simple encoding and decoding.

Reference is made first to FIG. 1 for illustrating a simplified block diagram of various electronic devices that are suitable for use in practicing the exemplary embodiments of this invention. In FIG. 1 a wireless network 1 is adapted for communication with a UE 10 via a Node B (base station) 12, also referred to herein as an eNB 12. The network 1 may include a network control element (NCE) 14, such as an aGW. The UE 10 includes a data processor (DP) 10A, a memory (MEM) 10B that stores a program (PROG) 10C, and a suitable radio frequency (RF) transceiver 10D for bidirectional wireless communications with the eNB 12, which also includes a DP 12A, a MEM 12B that stores a PROG 12C, and a suitable RF transceiver 12D. The eNB 12 is coupled via a data path 13 to the NCE 14 that also includes a DP 14A and a MEM 14B storing an associated PROG 14C. At least one of the PROGs 10C and 12C may be assumed to include program instructions that, when executed by the associated DP, enable the electronic device to operate in accordance with the exemplary embodiments of this invention, as will be discussed below in greater detail.

Of particular interest herein is a UE 10 PRB location encoding algorithm/apparatus (PRB_ENC) 10E, and a corresponding eNB 12 PRB location decoding algorithm/apparatus (PRB_DEC) 12E. The UE 10 is assumed to include a measurement unit (MU) 10F that feeds measurement results related to (good) PRBs into the PRB location encoding algorithm/apparatus 10E. The output of the PRB location encoding algorithm/apparatus 10E is used when formulating a CQI report for the eNB 12. In the eNB 12 the PRB location decoding algorithm/apparatus 12E provides decoded PRB location information to at least a PS unit 12F and to a LA unit 12G.

By a PRB 'location', what is generally meant is the position of the PRB in a two-dimensional OFDM frequency sub-band/time space. Stated differently, what is implied is a group of frequency-time symbols within a total TTI symbol space, where a PRB is defined as a set of consecutive sub-carriers (e.g., 12 sub-carriers spanning 180 kHz in the LTE case) for a specific duration of time (e.g., 1 ms in the LTE case). However, and as was noted above, the measurement PRB size may be defined to contain two or more physical PRBs.

The PRB location encoding algorithm/apparatus 10E and the PRB location decoding algorithm/apparatus 12E may be implemented as computer software stored in a computer-readable memory medium and executable by the DP 10A of the UE 10 and by the DP 12A of the eNB 12, respectively, or by hardware, or by a combination of software (and/or firmware) and hardware. A desired result is that the UE 10 efficiently sends (signals) a CQI report to the eNB 12 that is indicative of some number of best PRBs measured by the UE 10. Another desired result is that the eNB 12 be capable of quickly and efficiently decoding the content of the CQI report to identify the locations of those PRBs deemed to be good PRBs by the UE 10 so that at least efficient packet scheduling and link adaptation may be performed at the eNB 12.

In general, the various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

The exemplary embodiments of this invention provide the UE 10 PRB location encoding algorithm/apparatus 10E, which may be referred to hereafter for simplicity as the PRB location encoder 10E, that compresses the portion of the CQI that signals where the M best PRBs are located (with full flexibility). The exemplary embodiments of this invention also pertain to the eNB 12 PRB location decoding algorithm/apparatus 12E, which may be referred to hereafter for simplicity as the PRB location decoder 12E. The PRB location decoder 12E is capable of decoding the CQI signalling received from the UE 10 and extracting the information pertaining to the locations of the best M PRBs. It is assumed that both the UE 10 and the eNB 12 have knowledge of the value of M for a current CQI report. For the best-M case, this can be set up directly in the CQI configuration, while in other techniques (e.g., threshold CQI) the value of M may be implicitly signaled with the CQI report. By restricting the value of M to certain maximum values, it is shown that one may still achieve significant signalling savings for the threshold CQI approach. However, the gain is maximized when the value of M need not be explicitly signaled (as in the best-M technique).

It should be noted that the use of the exemplary embodiments of this invention provides a theoretically optimum compression of the PRB location information when full flexibility (on where the PRBs are located) is desired, and thus would be found to correspond to the basic working assumption in 3GPP for the best-M approach.

Note further that the exemplary embodiments of this invention encompass at least two areas, where one area is related to encoding the PRB location information and where another area is one related to the low-complexity decoding of same.

The exemplary embodiments of this invention are thus implemented partially in the UE 10 (in the PRB location encoder 10E) and partially in the eNB 12 (in the PRB location decoder 12E). Note that while a novel and efficient decoding scheme is disclosed below for use in the eNB 12, other decoding schemes could be employed, such as but not limited to, exhaustive search and table-lookup. That is, the use of the novel PRB location encoding technique at the UE 10 does not mandate the use of any specific decoder for same at the eNB 12.

With regard now to the PRB Location Encoder 10E, the UE 10 encodes the best PRBs by the following procedure/algorithm. First, the vector x is introduced that denotes the location of each of the M PRBs.

$$x=[x_1\ x_2 \Lambda x_M] \text{ where } x_j \in [1, N_{PRB}] \forall j.$$

Here, $N_{PRB}$ denotes the number of PRBs (e.g., reporting PRBs for CQI) and $x_j$ indicates the location of the jth PRB. Further, assume that the PRB vector is ordered, e.g.:

$$x_1 < x_2 < x_3 < \Lambda < x_M.$$

The encoding algorithm may be formulated mathematically. For specific settings for M one may derive closed form equations for mapping the x-vector to a specific code word. However, for simplicity the general encoding method (which may be optimized further in a specific implementation) and the general equation, when x and the number of PRBs are known, is shown below for convenience, and not by way of limitation, as a computer program listing (as a Matlab language notation as a non-limiting example).

```
function CQIWORD = calcCqi (x, NPRB);
M=length(x);
for m=1:M
    numPos=NPRB-x(m);
    numPlacements=M-m+1;
    if and(numPos  >  0.1,(numPos-numPlacements)  >  -0.1),
        y(m)  =  nchoosek(numPos,numPos-numPlacements);
    else
        y(m)=0;
    end
end
CQIWORD = sum(y);
```

In the above program code the CQIWORD is the end result when the vector x and the number of PRBs are given.

It can be noted that there are many orderings that may be considered for implementation. One example is to reverse the order of the PRB enumeration. For example, one may employ:

CQIWORDSIGNALLED=N!/(N−M)!/M!−CQI-WORD, where it is assumed that both M and N are greater than zero. This may be implemented simply by reversing the definition of the x vector. However, one may assume that the above implementation is a "logical" one. Note that the values of CQIWORD can range from 0 and up to N!/(N−M)!/M!−1. That is, it is true to normal bit-wise notation.

Figure 2:
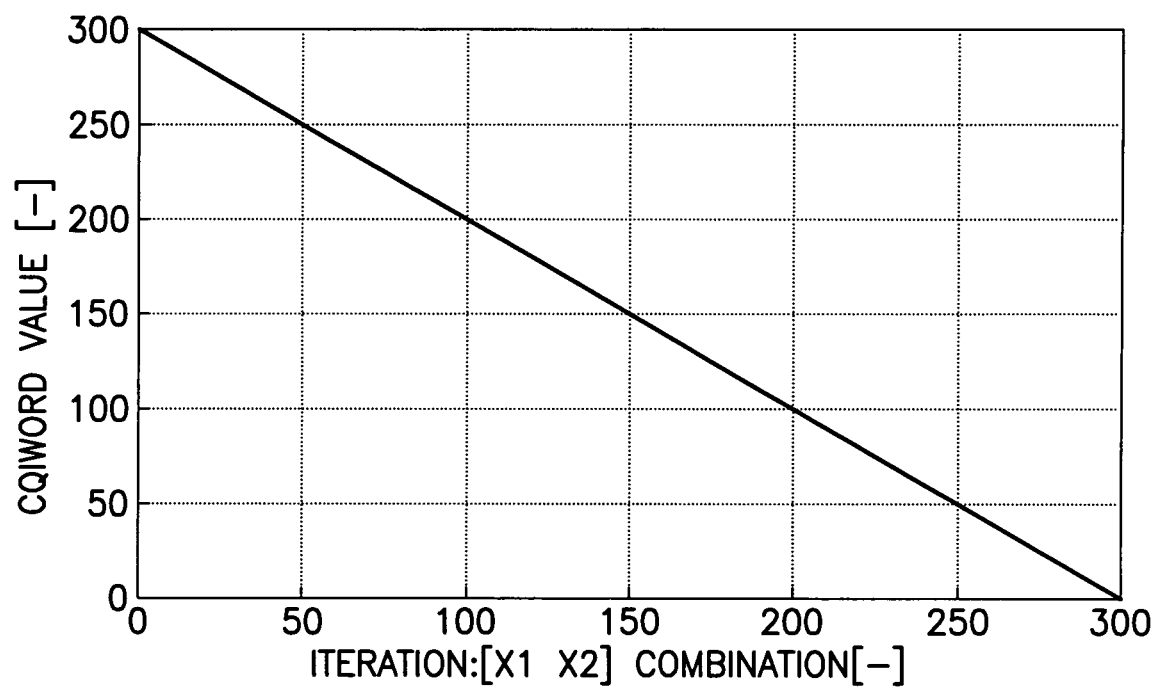
FIG. 2 is a graph that shows the results of running the CQI encoding algorithm in accordance with the exemplary embodiments of this invention on all combinations related to M=2 and NPRB=25, where altogether 300 possibilities exist and CQI word values returned range from 0-299.

Some examples of the use of the algorithm that highlight its operation and that show it produces a unique encoding are now provided (FIG. 2 depicts all 300 possibilities for M=2 and NPRB=25).

```
Cnt=1;
for x1=1:24,
    for x2=(x1+1):25,
        CQIW(Cnt)=calcCqi([x1 x2],25); Cnt=Cnt+1;
    end
end
```

As shown, the code produces a unique 1-1 mapping that is ordered depending on the location of the best PRBs.

Discussed now are the signaling savings as compared to the aforementioned previously proposed signaling schemes (e.g., using PRB location signaling for low-M and bit mask signaling for higher values of M). Assume as a non-limiting example a 10 MHz bandwidth case of EUTRAN, where NPRB=25. The savings are shown in the Table of FIG. 3. For M-values up to 10 there is a consistently large savings in signaling of about 10%-36%. One may note that the size of the CQI word depends on the setting for M. However, this is a general issue that is already the case for best-M approach, since a CQI report (of some size) has to be transmitted per M. Hence, the size of the total CQI report is already a function of M.

What follows now is a brief discussion of the theoretical basis for the above-described method and algorithm in accordance with the exemplary embodiments of this invention. It should be noted at the outset that the algorithm may be expressed and formulated in different forms and by using different notation. However, the fundamental principles are the same and, hence, the original encoding algorithm is restated below.

Background: Assume that there are N resource units (RUs), specifically PRBs, in a transmitter-receiver system and depending on the rate (or other constraints) a terminal can request a set of M best (or otherwise most suitable) PRBs. For this purpose a feedback signal needs to be sent to the transmitter containing the required scheduling information. To better formulate the problem assume that each individual PRB is assigned a unique number from a set $\{1,2,\ldots,N\}$. Then one may introduce the sets:

$$S_M = \{n = (n_m)_{m=1}^M : 1 \le n_1 < n_2 < \ldots < n_M \le N\},$$

$$\aleph_M \{1, 2, \Lambda, |S_M|\}.$$

Clearly, each vector in set $S_M$ refers to a unique PRB combination and there are $$|S_M| = \binom{N}{M}$$

elements in the set $S_M$.

Theoretical problem setting: Find a function $f_M: S_M \rightarrow \aleph_{MM}$ such that $f_M(S_M) = \aleph_{MM}$ ($f_M$ is onto) and $f_M(\tilde{n}) \neq f_M(n)$ if and only if $\tilde{n} \neq n$ ($f_M$ is one-to-one).

Solution: It has been found that the function shown below in Equation (1):

$$f_M(n) = 1 + \sum_{m=1}^{M} \left( u(n_m - m) \sum_{k=n_{m-1}+1}^{n_m - 1} \binom{N-k}{M-m} \right), \quad (1)$$

$$n_0 = 0, u(m) = \begin{cases} 0, & m = 0, \\ 1, & m \neq 0. \end{cases}$$

solves the stated problem.

Note that elements in the set $S_M$ may be ordered in different ways, leading to different forms of the solution function.

It can thus be seen that the use of the exemplary embodiments of this invention provide a naming convention that is optimal in the sense that it assigns a unique natural number from $\aleph_M$ to each RU (each PRB) combination, and these numbers can be readily mapped to bits of words of length $\lceil \log_2 (|S_M|) \rceil$.

Having thus described exemplary embodiments of the PRB location encoding algorithm/apparatus (PRB_ENC) 10E, a description is now made of various exemplary embodiments of the corresponding eNB PRB location decoding algorithm/apparatus (PRB_DEC) 12E.

In the ensuing description two different decoding embodiments are disclosed, although both should be seen as exemplary and non-limiting of the possible decoding techniques that may be applied by the PRB location decoding algorithm/apparatus (PRB_DEC) 12E.

The first decoding embodiment employs an eNB 12 decoding algorithm that utilizes statistical information to create a table of permutation combinations, and which then uses the resulting compact table to provide an efficient decoding of the received CQI codeword. An aspect of this approach is that the eNB 12 has knowledge of the encoding algorithm used in the UE 10 (and that encoding algorithm uses a statistically straight-forward approach). The second decoding embodiment is based on the use of encoding functions.

The decoding procedures utilize some of the statistical properties from the encoding procedure described above.

Following the encoding structure that was described above one may notice a bit output from the algorithm. This is clearly seen in the (simplistic) case of signalling M=2 out of N=5 PRBs. For these example values, the encoding algorithm described above provides the output shown in FIG. 4, wherein it may be noticed that there is a large degree of systematic behavior in the way that the CQI word is interpreted. For example, it may be noticed that if the first PRB is located at the first index, then there are four options for placing the second PRB index. Similarly, if the first PRB is located in the fourth PRB, then there is only a single option for the second PRB (the 5$^{th}$ PRB). By expanding this example to higher values of M it can be shown that there is a connection between the location of the first PRB and the limited options for the rest of the allocated PRBs. That is, in accordance with the underlying assumption made by the encoding algorithm that was described above, it is assumed that the PRB vector is ordered, e.g.:

$$x_1 < x_2 < x_3 < \Lambda < x_M.$$

Following these constraints, it has been found that the equation for describing how to take M samples from a set of N fits this principle:

$$\Lambda = \frac{N!}{(N-M)!M!}$$

Again, looking at FIG. 4 one may employ the following reasoning:

If the base parameters are M=2 and N=5, then look at the case of x1=1.

In this case the first PRB has already been placed, and N has decreased by '1' due to the constraint of the ordering.

Thus the positioning of the second PRB can be seen as the problem of M=1 and N=4, where there are four options.

Similarly, if the first PRB is located at index 2, then there are the following values available for the estimation of the second index: M=1,N=3 (as there are only 3 possibilities above index 2).

The algorithm/argumentation is extendable to cover M out of N in general.

The general algorithm when x and the number of PRBs are known is shown below for convenience, and not as a limitation, as a computer program (Matlab language notation). This program conducts the inverse operation as compared to the Matlab representation discussed above for the PRB location encoding algorithm/apparatus (PRB_ENC) 10E.

```
function positions = extractCQI (cqiValue, N, M);
    nMax=N;
    Y=[ ];
    for mIndex=M:-1:1,
        [cqiValue, nMax, mIndex];
        [a b]=getPosition(cqiValue, nMax, mIndex);
        Y(M-mIndex+1)=a;
        nMax=nMax-a;
        cqiValue=b;
    end
    positions=cumsum(Y);
```

The following helper function can be applied (for getPosition):

```
function [position, newCqiVal] = getPosition (cqiVal, N, M);
    % Get the permutation vector over the solution space
    binomCoeff=zeros(1,N);
    for n=1:N,
        n;M;
        if(n>=M),
            binomCoeff(n)=nchoosek(n,M);
        end
    end
    binom2=fliplr(binomCoeff)';
    position = max(find(cqiVal<binom2));
    if(length(binom2)>position),
        newCqiVal = cqiVal-binom2(position+1);
    else
        newCqiVal = cqiVal;
    end
```

In the foregoing text beginning with % is a comment.

Note that the operation of the fliplr function basically switches the order of a vector, such that the first value is placed at the end and vice versa. The helper function is basically using an 'investigate the area below conditions' to extract the index for a given code word.

One element to note here is that the computational speed of the program may be increased significantly by putting the Λ values located in the binom2 vector into a two dimensional lookup table, such that these values are calculated one time only and do not need to be recalculated for each query in the helper function. Further, it should be noted that this description for simplicity addresses two issues:
(a) the decoding principle using the statistical approach, and
(b) using a table of the permutation options to facilitate the decoding procedure.

It should be noted that other optimum encoding schemes have their decoding counterparts which can be expected to rely on similar decoding principles.

The second decoding embodiment for the PRB location decoding algorithm/apparatus (PRB_DEC) 12E is now described in the context of a decoder based on the encoding function that was described above for the PRB location encoding algorithm/apparatus (PRB_ENC) 10E. Although formulated in a somewhat different manner than the above-described table-based decoder embodiment, the basic rules for both decoding approaches are same.

To illustrate additional details concerning the reverse mapping, the problem is restated below and shown in the context of an example for fundamental decoding. Note that the formulation and the notation of the different decoding approaches may differ, they rely on the same basic principles.

Recall the encoding embodiments described above, where it was shown that the naming convention was optimal in the sense that it assigns a unique natural number from $\aleph_M$ to each RU combination, and that these numbers can be readily mapped to bit words of length $\lceil \log_2(|S_M|) \rceil$.

Decoding problem: For a given M and $f_M(\hat{n})$ find $\hat{n}$.

The multi-stage decoder solution:

Compute values $g_1(k) = f_M(k, k+1, \ldots, k+M-1)$, $k=1, 2, \ldots, N-M+1$

Find k such that $g_1(k) \leq f_M(\hat{n}) \leq g_1(k+1)$

Set $\hat{n}_1 = k$

Go back to the first stage of computing values and search $\hat{n}_2$, $\hat{n}_3, \ldots \hat{n}_M$ during the following M−1 rounds.

An example of the foregoing is expressed below in an exemplary Matlab algorithm script.

```
clear all
M=5;
N=8;
n(1)=2;
n(2)=3;
n(3)=5;
n(4)=7;
n(5)=8;
apu=0;
for p=1:M
  if (n(p)>p)
    if (p==1)
      for k=1:n(p)-1
        apu=apu+prod(1:N-k)/(prod(1:M-p)*prod(1:N-k-M+p));
      end
    else
      for k=n(p-1)+1:n(p)-1
        apu=apu+prod(1:N-k)/(prod(1:M-p)*prod(1:N-k-M+p));
      end
    end
```

```
    end
  end
  apu=1+apu
```

Figure 6:
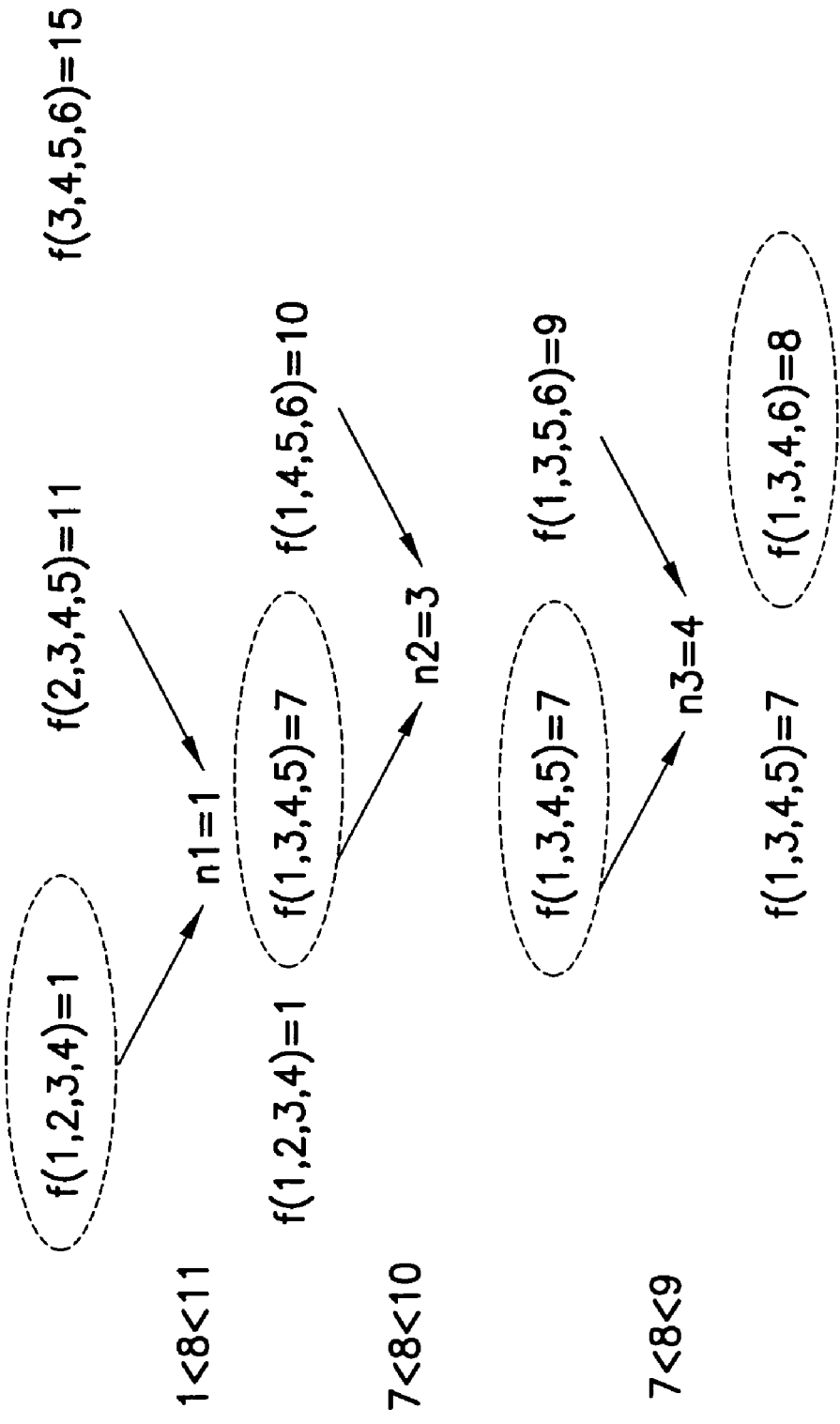

Referring to FIG. 5, in an encoding example the encoding function of Equation (1) was applied. The circles in FIG. 5 refer to the first stage of the exemplary decoding example illustrated in FIG. 6. In first stage the value of function 'f' is for indices (1,2,3,4), (2,3,4,5), (3,4,5,6). Since it is known that the value of 'f' is 8 (e.g., such as having been fed back to the transmitter), and 1<8<11, it is known that first component of the index (x,y,z,w) that is being searched for is 1 (thus, x=1).

Hence, in first decoding stage there is computed the value of function of Equation (1) for n1=1,2, . . . ,M−1, n2=n1+1, n3=n1+2, . . . The decoding process continues until the function value f(n2,n1+1,n1+2, . . . ) is found that is larger than or equal to the given CQI value ('8' in this case). After finding n1 in this manner, the first RU index is known. The decoder 12E then fixes n1 and begins searching for n2. This operation is performed in a similar manner as the search for n1. After all indices are processed, the decoder 12E has found the set of RU indices.

Based on the foregoing it should be apparent that the exemplary embodiments of this invention provide a method, apparatus and computer program product to encode a report that describes locations of M PRBs. A method includes measuring and determining a plurality of best PRBs in a received OFDM signal; and encoding locations of M best PRBs in accordance with a procedure described by:

```
function CQIWORD = calcCqi (x, NPRB);
M=length(x);
for m=1:M
  numPos=NPRB-x(m);
  numPlacements=M-m+1;
  if   and(numPos  >  0.1, (numPos-numPlacements) > -0.1),
        y(m)  =  nchoosek(numPos,numPos-numPlacements);
  else
        y(m)=0;
  end
end
CQIWORD = sum(y);
``` where x is a vector that denotes the location of each of M PRBs $x = [x_1 x_2 \Lambda x_M]$ where $x_j \in [1, N_{PRB}] \forall j$, where $N_{PRB}$ denotes the number of reporting PRBs for CQI and $x_j$ indicates the location of the jth PRB, and where the PRB vector is ordered $x_1 < x_2 < x_3 < \Lambda < x_M$.

The method, apparatus and computer program product of the previous paragraph, where encoding produces a unique 1-1 mapping that is ordered depending on the location of the best PRBs.

The method, apparatus and computer program product of the previous paragraphs, further comprising reporting CQI-WORD to a base station using uplink signaling.

The method, apparatus and computer program product of the previous paragraphs, where the value of M is one of known a priori to both a UE and to an eNB, or is explicitly signaled between the UE and the eNB.

The method, apparatus and computer program product of the previous paragraphs, further comprising decoding CQI-WORD at the eNB to extract the locations of the best PRBs.

A method, as in the preceding paragraph, further comprising a method to decode CQIWORD. The method includes receiving a CQI report in uplink signaling, the CQI report comprising CQIWORD, and decoding CQIWORD in accordance with a procedure described by:

```
function positions = extractCQI (cqiValue, N, M);
   nMax=N;
   Y=[ ];
   for mIndex=M:-1:1,
      [cqiValue, nMax, mIndex];
      [a b]=getPosition(cqiValue, nMax, mIndex);
      Y(M-mIndex+1)=a;
      nMax=nMax-a;
      cqiValue=b;
   end
   positions=cumsum(Y).
```

The method of the preceding paragraph, further comprising use of a helper function for getPosition:

```
function [position, newCqiVal] = getPosition (cqiVal, N, M);
   binomCoeff=zeros(1,N);
   for n=1:N,
      n;M;
      if(n>=M),
         binomCoeff(n)=nchoosek(n,M);
      end
   end
   binom2=fliplr(binomCoeff)';
   position = max(find(cqiVal<binom2));
   if(length(binom2)>position),
      newCqiVal = cqiVal-binom2(position+1);
   else
      newCqiVal = cqiVal;
   end.
```

These various functions and operations may be viewed as method steps, and/or as operations that result from operation of computer program code, and/or as a plurality of coupled logic circuit elements constructed to carry out the associated function(s).

Further in accordance with an aspect of this invention an apparatus comprising a receiver operates to encode information descriptive of M perceived best ones of N resource units RUs, and to encode a feedback signal to be sent to a transmitter. In the operation of the apparatus each individual RU is assigned a unique number from a set $\{1, 2, \ldots, N\}$, and where there are sets:

$$S_M = \{n = (n_m)_{m=1}^M : 1 \leq n_1 < n_2 < \ldots < n_M \leq N\},$$

$$\aleph_M = \{1, 2, \Lambda, |S_M|\},$$

where each vector in set $S_M$ refers to a unique RU combination and where there are $$|S_M| = \binom{N}{M}$$

elements in the set $S_M$.

The apparatus is configured to operate with a function $f_M: S_M \to \aleph_M$ such that $f_M(S_M) = \aleph_M$ ($f_M$ is onto) and $f_M(\tilde{n}) \neq f_M(n)$ if and only if $\tilde{n} \neq n$ ($f_M$ is one-to-one), and where the specific form of the function is given by:

$$f_M(n) = 1 + \sum_{m=1}^{M} \left( u(n_m - m) \sum_{k=n_{m-1}+1}^{n_m-1} \binom{N-k}{M-m} \right),$$

$$n_0 = 0,$$

$$u(m) = \begin{cases} 0, & m = 0, \\ 1, & m \neq 0. \end{cases}$$

where elements in the set $S_M$ may be ordered in different ways.

The apparatus as specified in the previous paragraphs, configured to operate in accordance with a naming convention that assigns a unique natural number from $\aleph_M$ to each RU combination, where assigned unique natural numbers are mapped to bit words of length $\lceil \log_2(|S_M|) \rceil$.

The apparatus as in the preceding paragraphs, further comprising multi-stage decoding apparatus configured, for a given M and $f_M(\hat{n})$ to find $\hat{n}$ by:

Computing values $g_1(k) = f_M(k, k+1, \ldots, k+M-1)$, $k=1, 2, \ldots, N-M+1$;

Finding k such that $g_1(k) \leq f_M(\hat{n}) \leq g_1(k+1)$;

Setting $\hat{n}_1 = k$; and

Going back to the first stage of computing values and searching $\hat{n}_2, \hat{n}_3, \ldots \hat{n}_M$ during successive M−1 rounds.

It should be further appreciated that disclosed herein is a method, apparatus and computer program product to decode an encoded CQI-related report to extract the locations of best PRBs from a CQIWORD, and where decoding to extract CQIWORD is in accordance with a procedure described by:

```
function positions = extractCQI (cqiValue, N, M);
   nMax=N;
   Y=[ ];
   for mIndex=M:-1:1,
      [cqiValue, nMax, mIndex];
      [a b]=getPosition(cqiValue, nMax, mIndex);
      Y(M-mIndex+1)=a;
      nMax=nMax-a;
      cqiValue=b;
   end
   positions=cumsum(Y).
```

The method, apparatus and computer program product of the preceding paragraph, further comprising use of a helper function for getPosition:

```
function [position, newCqiVal] = getPosition (cqiVal, N, M);
   binomCoeff=zeros(1,N);
   for n=1:N,
      n;M;
      if(n>=M),
         binomCoeff(n)=nchoosek(n,M);
      end
   end
   binom2=fliplr(binomCoeff)';
   position = max(find(cqiVal<binom2));
   if(length(binom2)>position),
      newCqiVal = cqiVal-binom2(position+1);
   else
      newCqiVal = cqiVal;
   end.
```

The exemplary embodiments of this invention also encompass a multi-stage decoding apparatus configured in response to a receipt of encoded information descriptive of M ones of N resource units RUs, where each individual RU is assigned a unique number from a set $\{1, 2, \ldots, N\}$, and where there are sets:

$$S_M = \{n = (n_m)_{m=1}^M : 1 \leq n_1 < n_2 < \ldots < n_M \leq N\},$$

$$\aleph_{MM} = \{1, 2, \Lambda, |S_M|\},$$

where each vector in set $S_M$ refers to a unique RU combination and where there are $$|S_M| = \binom{N}{M}$$

elements in the set $S_M$,
and where there is a function $f_M : S_M \rightarrow \aleph_{MM}$ such that $f_M(S_M) = \aleph_{MM}$ ($f_M$ is onto) and $f_M(\tilde{n}) \neq f_M(n)$ if and only if $\tilde{n} \neq n$ ($f_M$ is one-to-one), where elements in the set $S_M$ may be ordered in different ways, said decoder apparatus configured to operate, for a given M and $f_M(\hat{n})$, to find $\hat{n}$ by:
Computing values $g_1(k) = f_M(k, k+1, \ldots, k+M-1)$, $k=1, 2, \ldots, N-M+1$;
Finding k such that $g_1(k) \leq f_M(\hat{n}) \leq g_1(k+1)$;
Setting $\hat{n}_1 = k$; and
Going back to the first stage of computing values and searching $\hat{n}_2, \hat{n}_3, \ldots \hat{n}_M$ during successive M−1 rounds.

Further in accordance with an aspect of this invention an apparatus comprises receiver means; means for encoding information descriptive of M perceived best ones of N received physical resource blocks PRBs; and means for composing a feedback signal to be sent to a transmitter. In the operation of the apparatus each individual PRB is assigned a unique number from a set $\{1, 2, \ldots, N\}$, and where there are sets:

$$S_M = \{n = (n_m)_{m=1}^M : 1 \leq n_1 < n_2 < n_M \leq N\},$$

$$\aleph_M = \{1, 2, \Lambda, |S_M|\},$$

where each vector in set $S_M$ refers to a unique PRB combination and where there are $$|S_M| = \binom{N}{M}$$

elements in the set $S_M$.

In the apparatus the encoding means is configured to operate with a function $f_M : S_M \rightarrow \aleph_M$ such that $f_M(S_M) = \aleph_M f_M$ is onto) and $f_M(\tilde{n}) \neq f_M(n)$ if and only if $\tilde{n} \neq n$ ($f_M$ is one-to-one), and where the specific form of the function is given by:

$$f_M(n) = 1 + \sum_{m=1}^{M} \left( u(n_m - m) \sum_{k=n_{m-1}+1}^{n_m - 1} \binom{N-k}{M-m} \right),$$

$$n_0 = 0,$$

-continued $$u(m) = \begin{cases} 0, & m = 0, \\ 1, & m \neq 0. \end{cases}$$

where elements in the set $S_M$ may be ordered in different ways.

Further in accordance with an aspect of this invention an apparatus comprises a receiver means and a multi-stage decoder means for decoding a received signal and, for a given M and $f_M(\hat{n})$, for finding n by:
Computing values $g_1(k) = f_M(k, k+1, \ldots, k+M-1)$, $k=1, 2, \ldots, N-M+1$;
Finding k such that $g_1(k) \leq f_M(\hat{n}) \leq g_1(k+1)$;
Setting $\hat{n}_1 = k$; and
Going back to the first stage of computing values and searching $\hat{n}_2, \hat{n}_3, \ldots \hat{n}_M$ during successive M−1 rounds.

Further in accordance with an aspect of this invention there is provided a computer program product embodied in a tangible memory medium and comprising program instructions that, when executed by at least one data processor, result in operations that comprise operating a multi-stage decoder for decoding a received signal, for a given M and $f_M(\hat{n})$, to find $\hat{n}$ by:
Computing values $g_1(k) = f_M(k, k+1, \ldots, k+M-1)$, $k=1, 2, \ldots, N-M+1$;
Finding k such that $g_1(k) \leq f_M(\hat{n}) \leq g_1(k+1)$;
Setting $\hat{n}_1 = k$; and
Going back to the first stage of computing values and searching $\hat{n}_2, \hat{n}_3, \ldots \hat{n}_M$ during successive M−1 rounds.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Various modifications and adaptations to the foregoing exemplary embodiments of this invention may become apparent to those skilled in the relevant arts in view of the foregoing description, when read in conjunction with the accompanying drawings. However, any and all such modifications will still fall within the scope of the non-limiting and exemplary embodiments of this invention.

For example, and while the exemplary embodiments have been described above in the context of the E-UTRAN (UT-RAN-LTE) system, it should be appreciated that the exemplary embodiments of this invention are not limited for use with only this one particular type of wireless communication system, and that they may be used to advantage in other wireless communication systems. In general, the exemplary embodiments of this invention may be employed to advantage in any type of current or future radio system where it is desired to indicate resource units with as small amount of signaling (e.g., CQI signaling) as possible. One non-limiting example of this type of system may be an International Mobile Telecommunications (IMT)-Advanced system.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
encoding information descriptive of M perceived best ones of N resource units (Rus), where each individual resource unit (RU) is assigned a unique number from a set $$\{1,2,\ldots,N\},$$

where M is the number of most suitable RUs,
where N is the total number of RUs,
where there are sets:

$$S_M = \{n = (n_m)_{m=1}^M : 1 \leq n_1 < n_2 < \ldots < n_M \leq N\},$$

$$\aleph_M = \{1,2,\ldots,|S_M|\},$$

where each vector in set $S_M$ refers to a unique RU combination and where there are $$|S_M| = \binom{N}{M}$$

elements in the set $S_M$; and
transmitting the encoded information from a first wireless apparatus to a second wireless apparatus.

2. The method of claim 1, operating with a function $f_M : S_M \to \aleph_M$ such that $f_M(S_M) = \aleph_M$ ($f_M$ is onto) and $f_M(\tilde{n}) \neq f_M(n)$ if and only if $\tilde{n} \neq n$ ($f_M$ is one-to-one), and where a specific form of the function is given by:

$$f_M(n) = 1 + \sum_{m=1}^{M} \left( u(n_m - m) \sum_{k=n_{m-1}+1}^{n_m - 1} \binom{N-k}{M-m} \right),$$

$$n_0 = 0,$$

$$u(m) = \begin{cases} 0, & m = 0, \\ 1, & m \neq 0 \end{cases}$$

where elements in the set $S_M$ can be ordered in different ways.

3. The method of claim 1, operating in accordance with a naming convention that assigns a unique natural number from $\aleph_M$ to each RU combination, where assigned unique natural numbers are mapped to bit words of length $\lceil \log_2(|S_M|) \rceil$.

4. The method of claim 1, where the RUs are physical resource blocks in a two-dimensional frequency/time space.

5. A computer-readable memory medium that stores computer program instructions, the execution of the computer program instructions resulting in operations that comprise:
encoding information descriptive of M perceived best ones of N resource units (Rus), where each individual resource unit (RU) is assigned a unique number from a set $$\{1,2,\ldots,N\},$$

where M is the number of most suitable RUs,
where N is the total number of RUs,
where there are sets:

$$S_M = \{n = (n_m)_{m=1}^M : 1 \leq n_1 < n_2 < \ldots < n_M \leq N\},$$

$$\aleph_M = \{1,2,\ldots,|S_M|\},$$

where each vector in set $S_M$ refers to a unique RU combination and where there are $$|S_M| = \binom{N}{M}$$

elements in the set $S_M$; and
transmitting the encoded information from a first wireless apparatus to a second wireless apparatus.

6. The computer-readable memory medium of claim 5, operating with a function $f_M : S_M \to \aleph_M$ such that $f_M(S_M) = \aleph_M$ ($f_M$ is onto) and $f_M(\tilde{n}) \neq f_M(n)$ if and only if $\tilde{n} \neq n$ ($f_M$ is one-to-one), and where a specific form of the function is given by:

$$f_M(n) = 1 + \sum_{m=1}^{M} \left( u(n_m - m) \sum_{k=n_{m-1}+1}^{n_m - 1} \binom{N-k}{M-m} \right),$$

$$n_0 = 0,$$

$$u(m) = \begin{cases} 0, & m = 0, \\ 1, & m \neq 0 \end{cases}$$

where elements in the set $S_M$ can be ordered in different ways.

7. The computer-readable memory medium of claim 5, operating in accordance with a naming convention that assigns a unique natural number from $\aleph_M$ to each RU combination, where assigned unique natural numbers are mapped to bit words of length $\lceil \log_2(|S_M|) \rceil$.

8. The computer-readable memory medium of claim 5, where the RUs are physical resource blocks in a two-dimensional frequency/time space.

9. An apparatus, comprising:
a resource unit (RU) measurement unit coupled to an output of a wireless receiver;
an encoder configurable to encode information descriptive of M perceived best ones of N resource units (RUs), where each individual RU is assigned a unique number from a set $\{1,2,\ldots,N\}$, where M is the number of most suitable RUs,
where N is the total number of RUs,
where there are sets:

$S_M = \{n=(n_m)_{m=1}^M : 1 \leq n_1 < n_2 < \ldots < n_M \leq N\}$, $\aleph_M = \{1,2,\ldots,|S_M|\}$, where each vector in set $S_M$ refers to a unique RU combination and where there are $$|S_M| = \binom{N}{M}$$

elements in the set $S_M$; and
a wireless transmitter configurable to transmit the encoded information to a wireless network apparatus.

10. The apparatus of claim 9, said encoder operating with a function $f_M: S_M \to \aleph_M$ such that $f_M(S_M) = \aleph_M$ ($f_M$ is onto) and $f_M(\tilde{n}) \neq f_M(n)$ if and only if $\tilde{n} \neq n$ ($f_M$ is one-to-one), and where a specific form of the function is given by:

$$f_M(n) = 1 + \sum_{m=1}^{M} \left( u(n_m - m) \sum_{k=n_{m-1}+1}^{n_m-1} \binom{N-k}{M-m} \right),$$

$n_0 = 0$, $u(m) = \begin{cases} 0, & m = 0, \\ 1, & m \neq 0 \end{cases}$ where elements in the set $S_M$ can be ordered in different ways.

11. The apparatus of claim 9, said encoder operating in accordance with a naming convention that assigns a unique natural number from $\aleph_M$ to each RU combination, where assigned unique natural numbers are mapped to bit words of length $\lceil \log_2(|S_M|) \rceil$.

12. The apparatus of claim 9, where the RUs are physical resource blocks in a two-dimensional frequency/time space.

13. A method, comprising:
receiving encoded information descriptive of M perceived best ones of N resource units (RUs), where each individual resource unit (RU) is assigned a unique number from a set $\{1,2,\ldots,N\}$,
where M is the number of most suitable RUs,
where N is the total number of RUs, where there are sets:

$S_M = \{n=(n_m)_{m=1}^M : 1 \leq n_1 < n_2 < \ldots < n_M \leq N\}$, $\aleph_M = \{1,2,\ldots,|S_M|\}$, where each vector in set $S_M$ refers to a unique RU combination and where there are $$|S_M| = \binom{N}{M}$$

elements in the set $S_M$,
and where there is a function $f_M: S_M \to \aleph_M$ such that $f_M(S_M) = \aleph_M$ ($f_M$ is onto) and $f_M(\tilde{n}) \neq f_M(n)$ if and only if $\tilde{n} \neq n$ ($f_M$ is one-to-one), where elements in the set $S_M$ can be ordered in different ways; and
decoding the received information, for a given M and $f_M(\hat{n})$, to find $\hat{n}$ by decoding steps that comprise:
A. computing values $g_1(k) = f_M(k, k+1, \ldots, k+M-1)$, $k=1,2,\ldots,N-M+1$;
B. finding k such that $g_1(k) \leq f_M(\hat{n}) \leq g_1(k+1)$;
c. setting $\hat{n}_1 = k$; and
returning to step A and searching $\hat{n}_2, \hat{n}_3, \ldots \hat{n}_M$ during successive M-1 decoding rounds.

14. The method of claim 13, performed in a base station apparatus, where the received information is encoded at a user equipment and comprises at least part of a channel quality report, and further comprising using the decoded information in the base station at least when making a user equipment scheduling decision.

15. The method of claim 13, where the RUs are physical resource blocks in a two-dimensional frequency/time space.

16. A computer-readable memory medium that stores computer program instructions, the execution of the computer program instructions resulting in operations that comprise:
receiving encoded information descriptive of M perceived best ones of N resource units (RUs), where each individual resource unit (RU) is assigned a unique number from a set $\{1,2,\ldots,N\}$,
where M is the number of most suitable RUs,
where N is the total number of RUs, where there are sets:

$S_M = \{n=(n_m)_{m=1}^M : 1 \leq n_1 < n_2 < \ldots 21\, n_M \leq N\}$, $\aleph_M = \{1,2,\ldots,|S^M|\}$, where each vector in set $S_M$ refers to a unique RU combination and where there are $$|S_M| = \binom{N}{M}$$

elements in the set $S_M$,
and where there is a function $f_M: S_M \to \aleph_M$ such that $f_M(S_M) = \aleph_M$ ($f_M$ is onto) and $f_M(\tilde{n}) \neq f_M(n)$ if and only if $\tilde{n} \neq n$ ($f_M$ is one-to-one), where elements in the set $S_M$ can be ordered in different ways; and
decoding the received information, for a given M and $f_M(\hat{n})$, to find $\hat{n}$ by decoding operations that comprise:
A. computing values $g_1(k) = f_M(k, k+1, \ldots, k+M-1)$, $k=1,2,\ldots,N-M+1$;
B. finding k such that $g_1(k) \leq f_M(\hat{n}) \leq g_1(k+1)$;
C. setting $\hat{n}_1 = k$; and
returning to operation A and searching $\hat{n}_2, \hat{n}_3, \ldots \hat{n}_M$ during successive M-1 decoding rounds.

17. The computer-readable memory medium of claim 16, embodied in a base station apparatus, where the received information is encoded at a user equipment and comprises at least part of a channel quality report, and further comprising an operation of using the decoded information in the base station at least when making a user equipment scheduling decision.

18. The computer-readable memory medium of claim 16, where the RUs are physical resource blocks in a two-dimensional frequency/time space.

19. An apparatus, comprising:
a receiver configurable to receive encoded information descriptive of M perceived best ones of N resource units (RUs), where each individual resource unit (RU) is assigned a unique number from a set $\{1,2,\ldots,N\}$,
where M is the number of most suitable RUs,
where N is the total number of RUs, where there are sets:

$S_M = \{n = (n_m)_{m=1}^M : 1 \leq n_1 < n_2 < \ldots < n_M \leq N\}$, $\aleph_M = \{1, 2, \ldots, |S_M|\}$, where each vector in set $S_M$ refers to a unique RU combination and where there are $$|S_M| = \binom{N}{M}$$

elements in the set $S_M$,
and where there is a function $f_M : S_M \to \aleph_M$ such that $f_M(S_M) = \aleph_M$ ($f_M$ is onto) and $f_M(\tilde{n}) \neq f_M(n)$ if and only if $\tilde{n} \neq n$ ($f_M$ is one-to-one), where elements in the set $S_M$ can be ordered in different ways; and a decoder coupled to an output of the receiver and configurable to decode the received information, for a given M and $f_M(\hat{n})$, to find $\hat{n}$ by decoding operations that comprise:

A. computing values $g_1(k) = f_M(k, k+1, \ldots, k+M-1)$, $k = 1, 2, \ldots, N-M+1$;

B. finding k such that $g_1(k) \leq f_M(\hat{n}) \leq g_1(k+1)$;

C. setting $\hat{n}_1 = k$; and returning to operation A and searching $\hat{n}_2, \hat{n}_3, \ldots \hat{n}_M$ during successive M−1 decoding rounds.

20. The apparatus of claim 19, embodied in a base station apparatus, where the received information is encoded at a user equipment and comprises at least part of a channel quality report, and further at least one scheduling unit that uses the decoded information when making a user equipment scheduling decision.

21. The apparatus of claim 19, where the RUs are physical resource blocks in a two-dimensional frequency/time space.

* * * * *

UNITED STATES PATENT AND TRADEMARK OFFICE
CERTIFICATE OF CORRECTION

PATENT NO. : 7,843,801 B2
APPLICATION NO. : 12/075950
DATED : November 30, 2010
INVENTOR(S) : Kolding et al.

It is certified that error appears in the above-identified patent and that said Letters Patent is hereby corrected as shown below:

Claim 1, col. 17, line 41 delete "(Rus)" and insert --(RUs) --. Please refer to the amendment filed on June 15, 2010.

Claim 1, col.17, line 50 delete " $S_M = \{n = (n_m)_{m=1}^M : 1 \leq n_1 < n_2 < ... < n_M \leq N\}$ " and insert -- $S_M = \{\mathbf{n} = (n_m)_{m=1}^M : 1 \leq n_1 < n_2 < ... < n_M \leq N\}$ --. Please refer to the amendment filed on June 15, 2010.

Claim 5, col. 18, line 24 delete "(Rus)" and insert --(RUs)--. Please refer to the amendment filed on June 15, 2010.

Claim 5, col. 18, line 33 delete " $S_M = \{n = (n_m)_{m=1}^M : 1 \leq n_1 < n_2 < ... < n_M \leq N\}$ " and insert -- $S_M = \{\mathbf{n} = (n_m)_{m=1}^M : 1 \leq n_1 < n_2 < ... < n_M \leq N\}$ --. Please refer to the amendment filed on June 15, 2010.

Claim 9, col. 19, line 17 delete " $S_M = \{n = (n_m)_{m=1}^M : 1 \leq n_1 < n_2 < ... < n_M \leq N\}$ " and insert -- $S_M = \{\mathbf{n} = (n_m)_{m=1}^M : 1 \leq n_1 < n_2 < ... < n_M \leq N\}$ --. Please refer to the amendment filed on June 15, 2010.

Claim 13, col. 19, line 63 delete " $S_M = \{n = (n_m)_{m=1}^M : 1 \leq n_1 < n_2 < ... < n_M \leq N\}$ " and insert -- $S_M = \{\mathbf{n} = (n_m)_{m=1}^M : 1 \leq n_1 < n_2 < ... < n_M \leq N\}$ --. Please refer to the amendment filed on June 15, 2010.

Signed and Sealed this
Twenty-second Day of February, 2011

David J. Kappos
*Director of the United States Patent and Trademark Office*

CERTIFICATE OF CORRECTION (continued)
U.S. Pat. No. 7,843,801 B2

Claim 13, col. 20, line 17 delete "c." and insert --C.--. Please refer to the amendment filed on June 15, 2010.

Claim 16, col. 20, line 38 delete "$S_M = \{n = (n_m)_{m=1}^{M} : 1 \leq n_1 < n_2 < ... < n_M \leq N\}$" and insert -- $S_M = \{\mathbf{n} = (n_m)_{m=1}^{M} : 1 \leq n_1 < n_2 < ... < n_M \leq N\}$ --. Please refer to the amendment filed on June 15, 2010.

Claim 19, col. 21, line 12 delete "$S_M = \{n = (n_m)_{m=1}^{M} : 1 \leq n_1 < n_2 < ... < n_M \leq N\}$" and insert -- $S_M = \{\mathbf{n} = (n_m)_{m=1}^{M} : 1 \leq n_1 < n_2 < ... < n_M \leq N\}$ --. Please refer to the amendment filed on June 15, 2010.

Claim 19, col. 22, line 6 delete "71" and insert -- $f_M$ --. Please refer to the amendment filed on June 15, 2010.